(12) United States Patent
Kim

(10) Patent No.: US 12,195,122 B2
(45) Date of Patent: Jan. 14, 2025

(54) EMERGENCY STEERING CONTROL APPARATUS AND METHOD OF FOUR WHEEL INDEPENDENT STEERING SYSTEM

(71) Applicant: HYUNDAI MOBIS CO., LTD., Seoul (KR)

(72) Inventor: Tae Hong Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 10 days.

(21) Appl. No.: 18/360,940

(22) Filed: Jul. 28, 2023

(65) Prior Publication Data

US 2024/0190503 A1 Jun. 13, 2024

(30) Foreign Application Priority Data

Dec. 12, 2022 (KR) .................. 10-2022-0172629

(51) Int. Cl.
| | |
|---|---|
| *B62D 7/15* | (2006.01) |
| *B60W 10/04* | (2006.01) |
| *B60W 10/20* | (2006.01) |
| *B60W 30/18* | (2012.01) |
| *B62D 5/04* | (2006.01) |
| *B62D 6/00* | (2006.01) |

(52) U.S. Cl.
CPC ............ *B62D 7/159* (2013.01); *B60W 10/04* (2013.01); *B60W 10/20* (2013.01); *B60W 30/18145* (2013.01); *B62D 5/04* (2013.01); *B62D 5/046* (2013.01); *B62D 5/0484* (2013.01); *B62D 6/00* (2013.01); *B60W 2720/10* (2013.01); *B60Y 2306/13* (2013.01); *B60Y 2400/84* (2013.01)

(58) Field of Classification Search
CPC . B62D 7/159; B62D 5/04; B62D 6/00; B62D 5/0484; B62D 5/046; B60W 10/04; B60W 10/20; B60W 2720/10; B60W 30/18145; B60Y 2306/13; B60Y 2400/84
See application file for complete search history.

(56) References Cited

U.S. PATENT DOCUMENTS

| | | | | |
|---|---|---|---|---|
| 9,744,992 B2 * | 8/2017 | Han | ........................ | B62D 7/159 |
| 2013/0231799 A1 * | 9/2013 | Kimura | .................. | B62D 6/003 |
| | | | | 701/1 |
| 2015/0120145 A1 * | 4/2015 | Han | ........................ | B62D 7/148 |
| | | | | 701/43 |
| 2016/0016582 A1 * | 1/2016 | Han | ........................ | B62D 7/159 |
| | | | | 701/41 |
| 2021/0188252 A1 * | 6/2021 | Lu | ........................ | B60W 40/12 |
| 2021/0213935 A1 * | 7/2021 | Lu | ........................ | B60C 23/04 |

(Continued)

FOREIGN PATENT DOCUMENTS

KR          10-2274120 B1          7/2021

*Primary Examiner* — Phutthiwat Wongwian
*Assistant Examiner* — Susan E Scharpf
(74) *Attorney, Agent, or Firm* — NSIP Law

(57) ABSTRACT

An emergency steering control apparatus of a four-wheel independent steering system includes a sensor module to detect a malfunction in a steering system of a vehicle provided with a wheel independent steering system and a processor to, when at least one leading wheel in a direction of movement of the vehicle malfunctions during forward movement or reverse movement of the vehicle, control normal wheels located opposite the at least one malfunctioning wheel in the direction of the movement so that the vehicle turns in an intended direction for emergency parking.

16 Claims, 4 Drawing Sheets

(56) References Cited

U.S. PATENT DOCUMENTS

| | | | |
|---|---|---|---|
| 2022/0126914 A1* | 4/2022 | Park | B60K 35/22 |
| 2023/0037740 A1* | 2/2023 | Ha | B60W 10/22 |
| 2023/0159086 A1* | 5/2023 | Lee | B62D 5/0418 |
| | | | 180/413 |
| 2023/0227102 A1* | 7/2023 | Kim | B62D 6/003 |
| | | | 701/41 |

* cited by examiner

EMERGENCY STEERING CONTROL APPARATUS AND METHOD OF FOUR WHEEL INDEPENDENT STEERING SYSTEM

CROSS-REFERENCE TO RELATED APPLICATION

This application claims priority from and the benefit under 35 USC § 119(a) of Korean Patent Application No. 10-2022-0172629, filed on Dec. 12, 2022, the entire disclosure of which is hereby incorporated by reference for all purposes as if set forth herein.

BACKGROUND

Field

Exemplary embodiments of the present disclosure relate to an emergency steering control apparatus and method of a four-wheel independent steering system and more particularly, to an emergency steering control apparatus and method of a four-wheel independent steering system configured to continuously drive a vehicle on a target route by emergency steering control when the four-wheel independent steering system malfunctions.

Discussion of the Background

Recently, an in-wheel motor system able to independently drive four wheels of a vehicle using a motor disposed inside the wheels is being developed.

When a four-wheel independent driving and four-wheel independent steering system is implemented by systematically combining such an in-wheel motor system to a vehicle, more flexible and diverse driving performance may be advantageously provided.

In existing common vehicles, only the front wheels are steered to change the driving direction of the vehicle. In this case, since a point in time at which the front wheels generate lateral force differs from a point in time at which the rear wheels generate lateral force, the driving direction of the vehicle does not coincide with the view direction of the driver. However, in the four-wheel independent steering system, the steering system is also applied to the rear wheels. Thus, the turning radius of the vehicle during parking or turning at a low speed may be reduced, and driving stability may be improved when turning at high speed.

However, in the related art, when the four-wheel independent steering system malfunctions, it is impossible to control the vehicle on a target path since steering control cannot be performed. That is, in such a malfunctioning (or failure) situation in which the steering control is not performed as described above, the driver cannot continuously control the vehicle.

The background art of the present disclosure is disclosed in Korean Patent No. 10-2274120 (published on Jul. 1, 2021; "Control Apparatus and Method of Rear-Wheel Steering System").

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

Various embodiments are directed to an emergency steering control apparatus and method of a four-wheel independent steering system, the apparatus and method being configured to continuously drive a vehicle on a target route by emergency steering control when the four-wheel independent steering system malfunctions.

In one general aspect, an emergency steering control apparatus includes: a sensor module configured to detect a malfunction in a steering system of a vehicle with a four-wheel independent steering system; and a processor configured to, when at least one leading wheel in a direction of movement of the vehicle malfunctions during forward movement or reverse movement of the vehicle, control normal wheels located opposite the at least one malfunctioning wheel in the direction of the movement so that the vehicle turns in an intended direction for emergency parking.

When the malfunction in the steering system is detected, the processor may be configured to gradually control a vehicle speed to be the same as or lower than a designated specific value.

When a wheel angle currently under control is greater than a neutral angle, the processor may be configured to control the vehicle speed to be higher than the designated specific value, and when the wheel angle currently under control is within a designated angle range of the neutral angle, the processor may be configured to control the vehicle speed to be lower than the designated specific value.

When the malfunction in the steering system is detected, the processor may be configured to turn off all of control power of the at least one malfunctioning wheel and control power of a normal mating wheel located on the right or left so that steering is performed in a direction following movement curves of the normal wheels without further control.

When controlling the normal wheels located opposite the at least one malfunctioning wheel in the direction of the movement, the processor may be configured to perform the reverse movement or the forward movement while controlling all wheel angles of the normal wheels to gradually become a designated angle, thereby causing the at least one malfunctioning wheel to be steered without further control to follow a movement curve of a corresponding one of the normal wheels.

When the at least one malfunctioning wheel during the forward movement of the vehicle is a front wheel, the processor may be configured to control rear wheels to linearly move backwards in order to cause front wheels to be steered to a neutral angle without further control, and to control the rear wheels to move backwards along curves in order to cause the front wheels to be steered without further control to angles opposite to angles of the rear wheels.

When the at least one malfunctioning wheel during the reverse movement of the vehicle is a rear wheel, the processor may be configured to control front wheels to linearly move forwards in order to cause rear wheels to be steered to a neutral angle without further control, and to control the front wheels to move forwards along curves in order to cause the rear wheels to be steered without further control to angles opposite to angles of the front wheels.

When the at least one malfunctioning wheel is steered to an intended direction without further control, the processor may be configured to increase a vehicle speed limit value in a direction in which the vehicle is intended to be driven, and to control wheel speeds of the normal wheels on the right and left to be the same or different, thereby gradually adjusting the direction of the movement.

In another general aspect, an emergency steering control method includes: detecting, by a processor, a malfunction in a steering system of a vehicle provided with a four-wheel independent steering system using a sensor module; and when at least one leading wheel in a direction of movement of the vehicle malfunctions during forward movement or reverse movement of the vehicle, controlling, by the processor, normal wheels located opposite the at least one malfunctioning wheel in the direction of the movement so that the vehicle turns in an intended direction for emergency parking.

The method may include, after the malfunction in the steering system is detected, gradually controlling, by the processor, a vehicle speed to be the same as or lower than a designated specific value.

When a wheel angle currently under control is greater than a neutral angle, the processor may be configured to control the vehicle speed to be higher than the designated specific value, and when the wheel angle currently under control is within a designated angle range of the neutral angle, the processor may be configured to control the vehicle speed to be lower than the designated specific value.

The method may include, after the malfunction in the steering system is detected, turning off, by the processor, all of control power of the at least one malfunctioning wheel and control power of a normal mating wheel located on the right or left of the at least one malfunctioning wheel.

According to an aspect of the present disclosure, it is possible to continuously drive a vehicle on a target route by emergency steering control when a four-wheel independent steering system malfunctions.

In addition, according to the present disclosure, it is possible to continuously control the vehicle in a direction that a driver intends even when the four-wheel independent steering system malfunctions.

Furthermore, according to the present disclosure, even in the case in which a malfunctioning wheel is not fixed using a separate mechanical device, it is possible to continuously control the vehicle, thereby reducing cost.

Other features and aspects will be apparent from the following detailed description, the drawings, and the claims.

DETAILED DESCRIPTION

Figure 1:
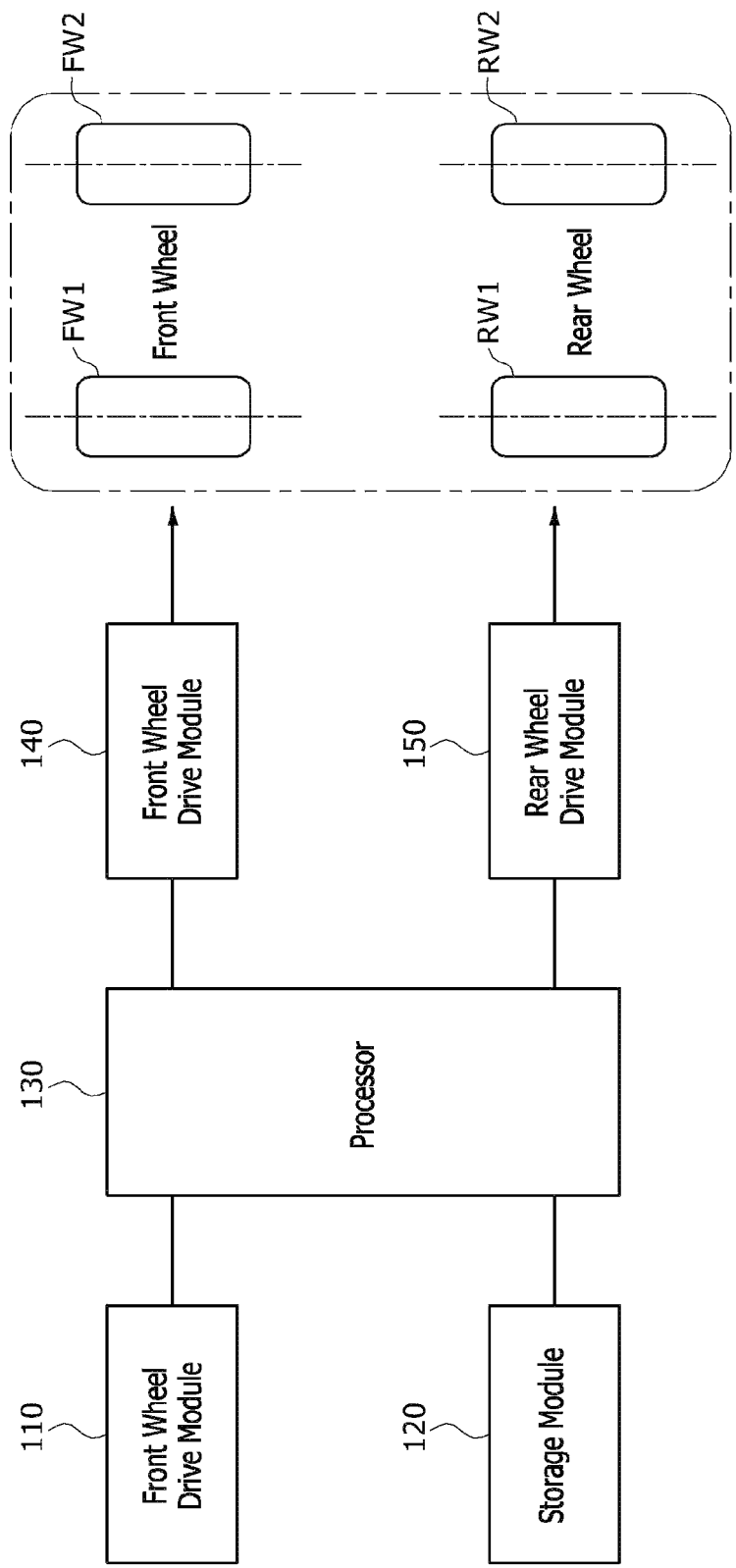
FIG. 1 is a diagram illustrating a schematic configuration of an emergency steering control apparatus of a four-wheel independent steering system according to an embodiment of the present disclosure.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

Hereinafter, with reference to the accompanying drawings, embodiments of the present disclosure will be described in detail so that a person skilled in the art can readily carry out the present disclosure. However, the present disclosure may be embodied in many different forms and is not limited to the embodiments described herein.

In the following description of the embodiments of the present disclosure, a detailed description of known functions and configurations incorporated herein will be omitted when it may make the subject matter of the present disclosure rather unclear. Parts not related to the description of the present disclosure in the drawings are omitted, and like parts are denoted by similar reference numerals.

In the present disclosure, components that are distinguished from each other are intended to clearly illustrate each feature. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. In addition, embodiments that include other components in addition to the components described in the various embodiments are also included in the scope of the present disclosure.

Hereinafter, with reference to the accompanying drawings, embodiments of the present disclosure will be described in detail so that a person skilled in the art can readily carry out the present disclosure. However, the present disclosure may be embodied in many different forms and is not limited to the embodiments described herein.

In the following description of the embodiments of the present disclosure, a detailed description of known functions and configurations incorporated herein will be omitted when it may make the subject matter of the present disclosure rather unclear. Parts not related to the description of the present disclosure in the drawings are omitted, and like parts are denoted by similar reference numerals.

In the present disclosure, when a component is referred to as being "linked," "coupled," or "connected" to another component, it is understood that not only a direct connection relationship but also an indirect connection relationship through an intermediate component may also be included. In addition, when a component is referred to as "comprising" or "having" another component, it may mean further inclusion of another component not the exclusion thereof, unless explicitly described to the contrary.

In the present disclosure, the terms first, second, etc. are used only for the purpose of distinguishing one component from another, and do not limit the order or importance of components, etc., unless specifically stated otherwise. Thus, within the scope of this disclosure, a first component in one exemplary embodiment may be referred to as a second component in another embodiment, and similarly a second component in one exemplary embodiment may be referred to as a first component.

In the present disclosure, components that are distinguished from each other are intended to clearly illustrate each feature. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. In addition, exemplary embodiments that include other components in addition to the components described in the various embodiments are also included in the scope of the present disclosure.

Hereinafter, an emergency steering control apparatus and method of a four-wheel independent steering system will be described with reference to the accompanying drawings through various exemplary embodiments.

FIG. 1 is a diagram illustrating a schematic configuration of an emergency steering control apparatus of a four-wheel independent steering system according to an embodiment of the present disclosure.

As illustrated in FIG. 1, the emergency steering control apparatus of a four-wheel independent steering system according to the present embodiment includes a sensor module 110, a storage module 120, a processor 130, a front wheel drive module 140, and a rear wheel drive module 150.

The sensor module 110 includes a current sensor (i.e., a current detection sensor) and a steering angle sensor (i.e., a steering angle detection sensor).

In addition, the sensor module 110 may include a wheel speed sensor provided in each of front and rear wheels and an acceleration sensor configured to detect an acceleration.

The processor 130 may measure a steering angular velocity using a steering angle sensor.

In addition, the processor 130 controls the steering angles of the front and rear wheels, and corrects (or adjusts) a steering angle offset (i.e., the offset of the steering angle sensor) on the basis of information detected by the sensor module 110.

The storage module 120 stores information (or data) detected by the processor 130 using an algorithm configured to control the steering angles of the front and rear wheels, an algorithm configured to correct (or adjust) the steering angle offset (i.e., the offset of the steering angle sensor) on the basis of information detected by the sensor module 110 by controlling the steering angles of the front and rear wheels, and the sensor module 110.

Here, the storage module 120 and the processor 130 may be implemented as separate chips or may be integrated into a single chip including the storage module 120 inside the processor 130.

The storage module 120 may be implemented as at least one of a non-volatile memory device such as a read only memory (ROM), a programmable ROM (PROM), an erasable programmable ROM (EPROM), an electrically erasable programmable ROM (EEPROM), and a flash memory; a volatile memory device such as a random access memory (RAM); or a storage medium such as a hard disk drive (HDD) or a compact disc read-only memory (CD-ROM), but is not limited thereto.

In addition, the processor 130 may be implemented as an electronic control unit (ECU) configured to control the driving of the vehicle.

The front wheel drive module 140 is connected to front wheels FW1 and FW2, and may drive actuators (e.g., an actuator configured to adjust the direction of rotation, the rotation speed, and the steering speed of a front wheel using a motor or hydraulic pressure) of the front wheels FW1 and FW2, respectively, under the control of the processor 130.

The front wheel drive module 140 may be included in the processor 130.

The rear wheel drive module 150 is connected to rear wheels RW1 and RW2, and may drive actuators (e.g., an actuator configured to adjust the direction of rotation, the rotation speed, and the steering speed of a front wheel using a motor or hydraulic pressure) of the rear wheels RW1 and RW2, respectively, under the control of the processor 130.

The rear wheel drive module 150 may be included in the processor 130.

In addition, the processor 130 may control the steering angles of the front wheels and the steering angles of the rear wheels to be the same or different by controlling the front wheel drive module 140 and the rear wheel drive module 150.

Hereinafter, the operation of the processor 130 will be described with reference to a flowchart of FIG. 2.

Figure 2:
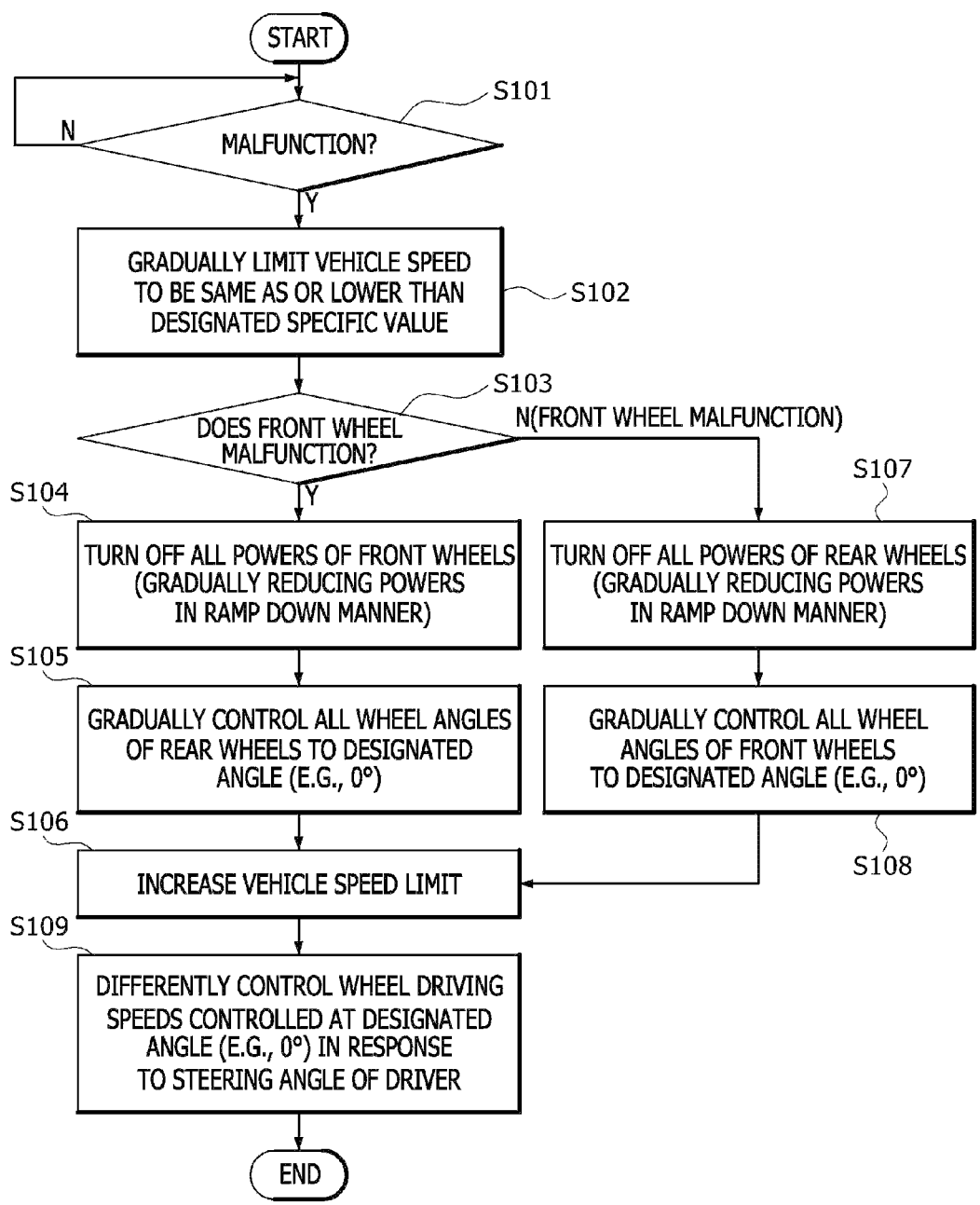
FIG. 2 is a flowchart illustrating an emergency steering control method of a four-wheel independent steering system according to an embodiment of the present disclosure.
Figure 3:
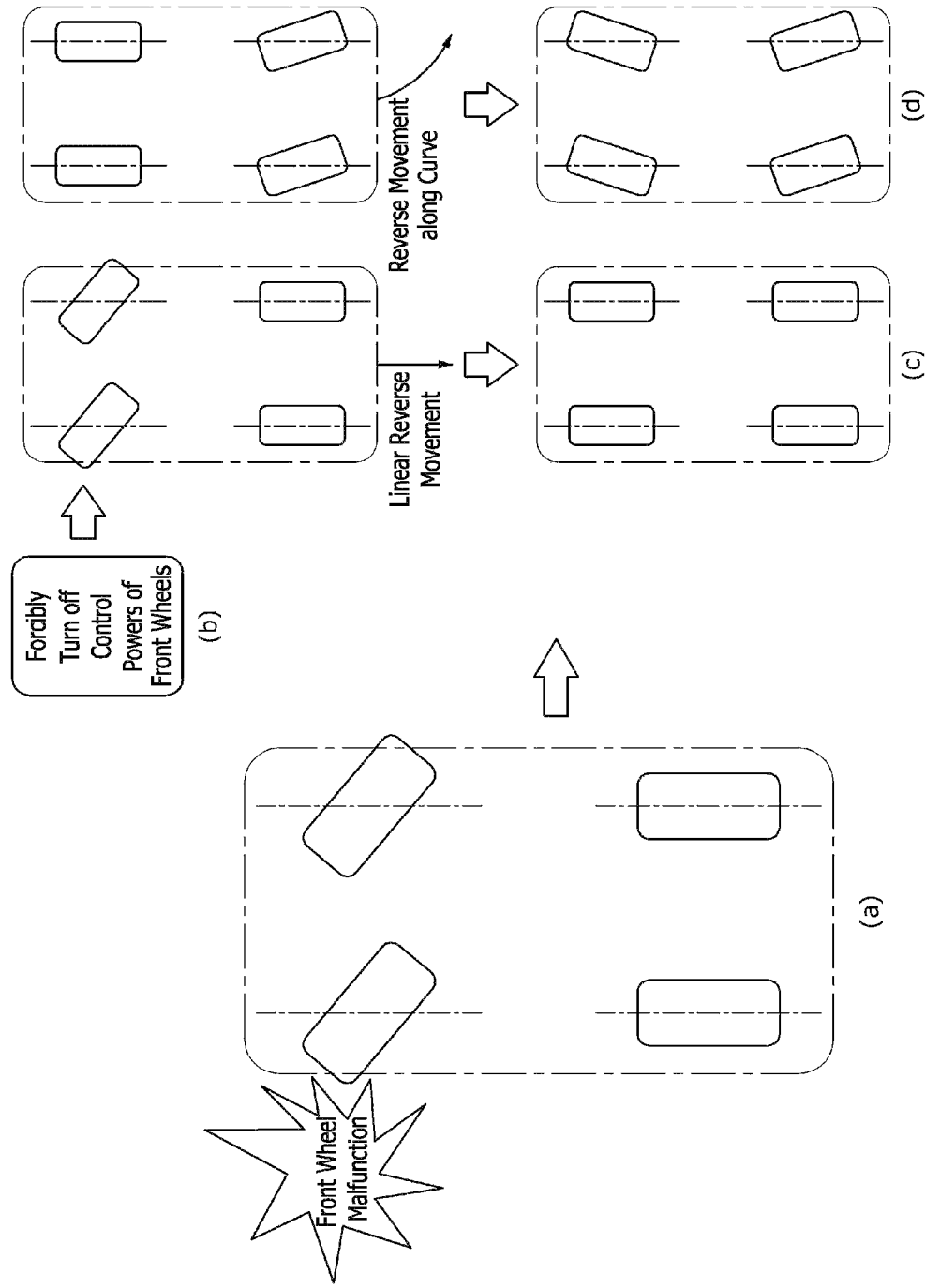
FIG. 3 is a diagram illustrating the emergency steering control method in FIG. 2 when at least one front wheel malfunctions.
Figure 4:
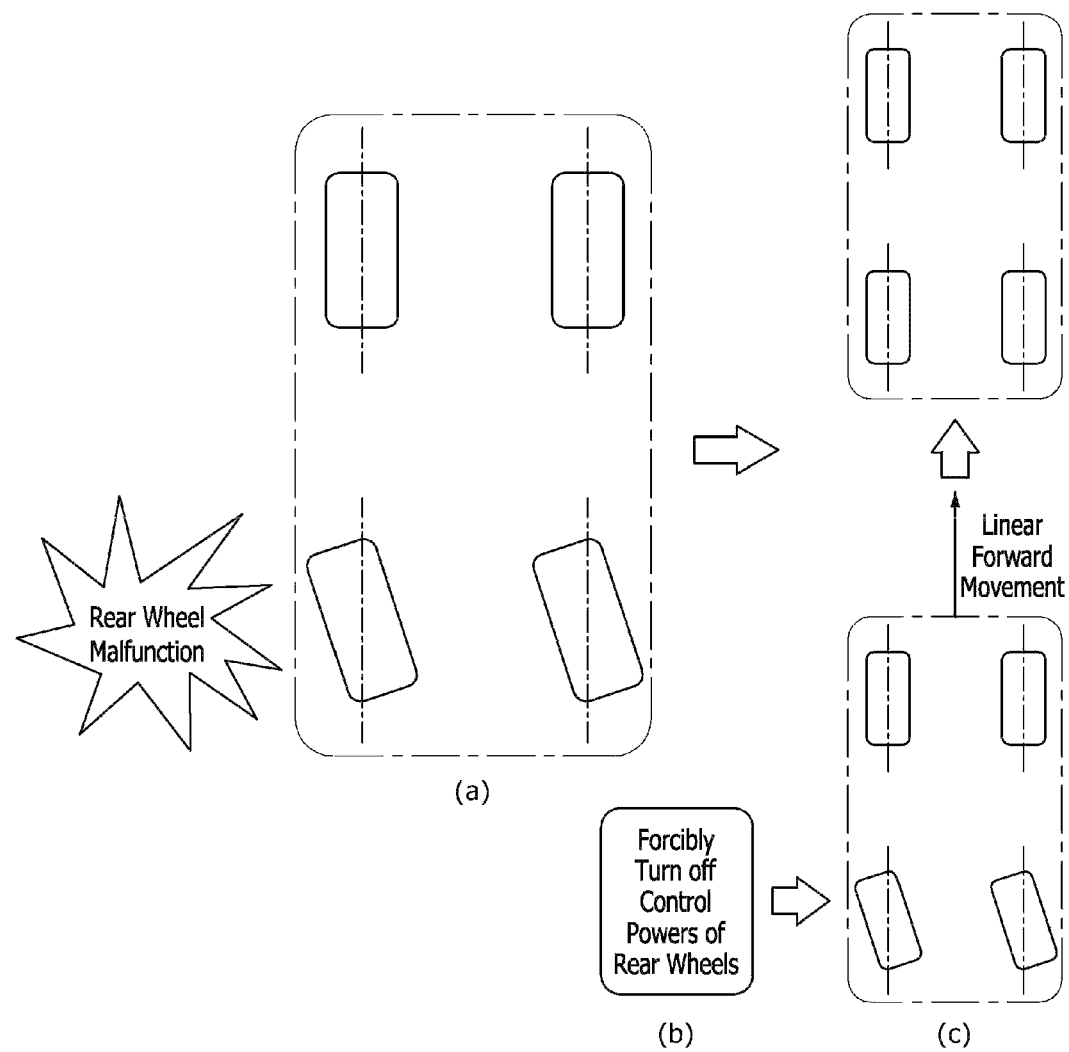
FIG. 4 is a diagram illustrating the emergency steering control method in FIG. 2 when at least one rear wheel malfunctions.

FIG. 2 is a flowchart illustrating an emergency steering control method of a four-wheel independent steering system according to an embodiment of the present disclosure, FIG. 3 is a diagram illustrating the emergency steering control method in FIG. 2 when at least one front wheel malfunctions, and FIG. 4 is a diagram illustrating the emergency steering control method in FIG. 2 when at least one rear wheel malfunctions.

Referring to FIG. 2, when the processor 130 detects a malfunction in a steering system as indicated with Y in S101, the speed of a vehicle is gradually limited (i.e., decelerated) to be the same or lower than a designated specific value (i.e., a specific base value) in S102.

In this case, when a wheel angle (i.e., a tire angle) currently under the control is greater than 0° (i.e., a neutral angle), i.e., in the case of a greater radius of turning, limiting the vehicle speed may be intensified (e.g., the vehicle speed may be limited to a specific value designated to a value lower than a reference specific value). When the wheel angle (i.e., the tire angle) currently under the control is close to 0° (i.e., a neutral angle) within a designated angle range, limiting the vehicle speed may be reduced (e.g., the vehicle speed may be limited to a specific value designated to a value higher than the reference specific value).

After the vehicle speed is decelerated as above, the processor 130 determines whether a front wheel malfunctions (i.e., front wheel malfunction) or a rear wheel malfunctions (i.e., rear wheel malfunction) in S103. In S104 and S107, the processor 130 turns off both the control power of a malfunctioning wheel (i.e., a front wheel or a rear wheel) and the control power of a normal mating wheel (i.e., a front mating wheel or a rear mating wheel) on the right or left.

For example, when one front wheel (e.g., a front left wheel) malfunctions, the processor 130 turns off both the control power of the malfunctioning wheel (i.e., a front wheel or a rear wheel) and the control power of the normal mating wheel (i.e., a front mating wheel or a rear mating wheel) on the right or left (e.g., turns off power by gradually reducing the power in a ramp down manner) in order to control the wheel angles (or tire angles) of the two front wheels (i.e., the malfunctioning front left wheel and the normal front right wheel) to be a designated angle (e.g., 0°) by the emergency steering control method.

After the control power of the malfunctioning wheel (i.e., a front wheel or a rear wheel) and the control power of the normal mating wheel (i.e., a front mating wheel or a rear mating wheel) are turned off, the processor 130 controls all wheel angles of the remaining wheels (e.g., the rear wheels when the malfunctioning wheel is a front wheel or the front wheels when the malfunctioning wheel is a rear wheel) that have not been turned off to gradually become the designated angle (e.g., 0°) in S105 and S108.

In this case, the processor 130 performs reverse or forward movement while controlling all wheel angles of the remaining wheels (e.g., the rear wheels when the malfunctioning wheel is a front wheel or the front wheels when the malfunctioning wheel is a rear wheel) that have not been turned off to gradually become the designated angle (e.g., 0°), thereby causing the malfunctioning wheel to be steered to an intended direction (i.e., an intended steering direction) without further control.

For example, when the front wheel malfunction has occurred as illustrated in FIG. 3 (a), all of the control powers of the front wheels are turned off, and then all of the wheel angles of the rear wheels are gradually controlled to the designated angle (e.g., 0°) in S105.

This is intended to change all of the wheel angles of the front wheels steered leftwards or rightwards by 0° (i.e., the neutral angle) or more to the designated angle (e.g., 0°) following the rear wheels. In this regard, as illustrated in FIGS. 3 (c) and (d), the processor 130 controls the front wheels to be steered in a direction following the movement curves of the rear wheels without further control by performing reverse movement (e.g., linear reverse movement or curved reverse movement). For example, as illustrated in FIG. 3 (c), when the rear wheels linearly move backwards, the front wheels are steered to 0° (i.e., the neutral angle) without further control. As illustrated in FIG. 3 (d), when the rear wheels move backwards along curves, the front wheels are steered without further control to angles opposite to the angles of the rear wheels.

In addition, when the rear wheel malfunction has occurred as illustrated in FIG. 4 (a), all of the control powers of the rear wheels are turned off, and then all of the wheel angles of the front wheels are gradually controlled to the designated angle (e.g., 0°) in S108.

This is intended to change all of the wheel angles of the rear wheels steered leftwards or rightwards by 0° (i.e., the neutral angle) or more to the designated angle (e.g., 0°) following the front wheels. For example, as illustrated in FIG. 4 (c), when the front wheels linearly move backwards, the rear wheels are steered to 0° (i.e., the neutral angle) without further control. Although not shown in the figure, when the front wheels move backwards along curves, the rear wheels are steered without further control to angles opposite to the angles of the rear wheels.

When the rear wheel malfunction has occurred during reverse movement of the vehicle, all of the control powers of the rear wheels, i.e., leading wheels when viewed in the moving direction (i.e., the direction of reverse movement), are turned off. Afterwards, the direction of reverse movement may be gradually adjusted by controlling the front wheels to be the same or different.

After the malfunctioning wheel is controlled to be steered without further control in the intended direction (i.e., the intended steering direction) as described above, the processor 130 increases a vehicle speed limit value (i.e., accelerates the vehicle) in S106.

Afterwards, in S109, the processor 130 may gradually adjust the direction of movement by controlling the speeds of the normal wheels (i.e., the normal rear wheels or the front wheels) to be the same or different, i.e., by controlling the driving speeds of the normal rear wheels or the normal front wheels to be the same or different.

For example, when the front wheel malfunction has occurred, when the processor 130 controls the rear right wheel to rotate faster than the rear left wheel, the vehicle turns to the left. When the processor 130 controls the rear left wheel to rotate faster than the rear right wheel, the vehicle turns to the right. When the rear wheel malfunction has occurred in a vehicle moving backwards, when the processor 130 controls the front right wheel to rotate faster than the left wheel, the vehicle moves backwards while turning to the left. When controls the front left wheel to rotate faster than the right wheel, the vehicle moves backwards while turning to the right.

Accordingly, emergency driving may be performed in a direction intended by the driver at a speed slower than a speed desired by the driver.

For reference, according to embodiments of the present disclosure, the vehicle speed is limited during emergency steering control, since the ability to control the vehicle is limited due to reduced braking force and low gripping force between the road and the tires. In addition, in the present embodiment, the front wheels may mean leading wheels when viewed in the direction of movement of the vehicle, while the rear wheels may mean following wheels when viewed in the direction of movement of the vehicle. For example, when the vehicle moves backwards, the leading wheels mean the rear wheels RW1 and RW2, and the following wheels mean the front wheels FW1 and FW2.

As described above, embodiments of the present disclosure may set a target yaw rate due to the difference in the wheel speed between the right and left wheels. This may determine the radius of turning, and on this basis, the actual steering angles of the front wheels may be calculated. That is, when any of leading wheels of a vehicle malfunctions during the vehicle is moving forwards or backwards, the vehicle may be turned in an intended direction by controlling following wheels in the direction of the movement. Consequently, emergency driving in the direction desired by the driver may be performed.

As set forth above, in embodiments of the present disclosure, when the four-wheel independent steering system malfunctions, the vehicle may be continuously driven on a target path by emergency steering control, and thus the safety and convenience of the vehicle may be improved. In addition, the vehicle may be continuously driven without fixing the malfunctioning wheel using a separate mechanical device, and thus a cost reducing effect may be obtained.

What is claimed is:

1. An emergency steering control apparatus, comprising:
a sensor module configured to detect a malfunction in a steering system of a vehicle with a four-wheel independent steering system; and
a processor configured to, when at least one leading wheel in a direction of movement of the vehicle malfunctions during forward movement or reverse movement of the vehicle, control normal wheels located opposite the at least one malfunctioning wheel in the direction of the movement so that the vehicle turns in an intended direction for emergency parking.

2. The emergency steering control apparatus according to claim 1, wherein when the malfunction in the steering system is detected, the processor is configured to gradually control a vehicle speed to be the same as or lower than a designated specific value.

3. The emergency steering control apparatus according to claim 2, wherein when a wheel angle currently under control is greater than a neutral angle, the processor is configured to control the vehicle speed to be higher than the designated specific value, and
when the wheel angle currently under control is within a designated angle range of the neutral angle, the processor is configured to control the vehicle speed to be lower than the designated specific value.

4. The emergency steering control apparatus according to claim 1, wherein when the malfunction in the steering system is detected, the processor is configured to turn off all of control power of the at least one malfunctioning wheel and control power of a normal mating wheel located on the right or left so that steering is performed in a direction following movement curves of the normal wheels without further control.

5. The emergency steering control apparatus according to claim 1, wherein when controlling the normal wheels located opposite the at least one malfunctioning wheel in the direction of the movement,
the processor is configured to perform the reverse movement or the forward movement while controlling all wheel angles of the normal wheels to gradually become a designated angle, thereby causing the at least one malfunctioning wheel to be steered without further control to follow a movement curve of a corresponding one of the normal wheels.

6. The emergency steering control apparatus according to claim 5, wherein when the at least one malfunctioning wheel during the forward movement of the vehicle is a front wheel, the processor is configured to control rear wheels to linearly move backwards in order to cause front wheels to be steered to a neutral angle without further control, and to control the rear wheels to move backwards along curves in order to cause the front wheels to be steered without further control to angles opposite to angles of the rear wheels.

7. The emergency steering control apparatus according to claim 5, wherein when the at least one malfunctioning wheel during the reverse movement of the vehicle is a rear wheel, the processor is configured to control front wheels to linearly move forwards in order to cause rear wheels to be steered to a neutral angle without further control, and to control the front wheels to move forwards along curves in order to cause the rear wheels to be steered without further control to angles opposite to angles of the front wheels.

8. The emergency steering control apparatus according to claim 5, wherein when the at least one malfunctioning wheel is steered to an intended direction without further control, the processor is configured to increase a vehicle speed limit value in a direction in which the vehicle is intended to be driven, and to control wheel speeds of the normal wheels on the right and left to be the same or different, thereby gradually adjusting the direction of the movement.

9. An emergency steering control method, comprising:

detecting, by a processor, a malfunction in a steering system of a vehicle provided with a four-wheel independent steering system using a sensor module; and when at least one leading wheel in a direction of movement of the vehicle malfunctions during forward movement or reverse movement of the vehicle, controlling, by the processor, normal wheels located opposite the at least one malfunctioning wheel in the direction of the movement so that the vehicle turns in an intended direction for emergency parking.

10. The emergency steering control method according to claim 9, further comprising, after the malfunction in the steering system is detected, gradually controlling, by the processor, a vehicle speed to be the same as or lower than a designated specific value.

11. The emergency steering control method according to claim 10, wherein when a wheel angle currently under control is greater than a neutral angle, the processor is configured to control the vehicle speed to be higher than the designated specific value, and when the wheel angle currently under control is within a designated angle range of the neutral angle, the processor is configured to control the vehicle speed to be lower than the designated specific value.

12. The emergency steering control method according to claim 9, further comprising, after the malfunction in the steering system is detected, turning off, by the processor, all of control power of the at least one malfunctioning wheel and control power of a normal mating wheel located on the right or left of the at least one malfunctioning wheel.

13. The emergency steering control method according to claim 9, wherein when controlling the normal wheels located opposite the at least one malfunctioning wheel in the direction of the movement, the processor is configured to perform the reverse movement or the forward movement while controlling all wheel angles of the normal wheels to gradually become a designated angle, thereby causing the malfunctioning wheel to be steered without further control to follow a movement curve of a corresponding one of the normal wheels.

14. The emergency steering control method according to claim 13, wherein when the at least one malfunctioning wheel during the forward movement of the vehicle is a front wheel, the processor is configured to control rear wheels to linearly move backwards in order to cause front wheels to be steered to a neutral angle without further control, and controls the rear wheels to move backwards along curves in order to cause the front wheels to be steered without further control to angles opposite to angles of the rear wheels.

15. The emergency steering control method according to claim 13, wherein when the at least one malfunctioning wheel during the reverse movement of the vehicle is a rear wheel, the processor is configured to control front wheels to linearly move forwards in order to cause rear wheels to be steered to a neutral angle without further control, and controls the front wheels to move forwards along curves in order to cause the rear wheels to be steered without further control to angles opposite to angles of the front wheels.

16. The emergency steering control method according to claim 13, wherein when the at least one malfunctioning wheel is steered to an intended direction without further control, the processor is configured to increase a vehicle speed limit value in a direction in which the vehicle is intended to be driven, and to control wheel speeds of the normal wheels on the right and left to be the same or different, thereby gradually adjusting the direction of the movement.

* * * * *